Figure 3:
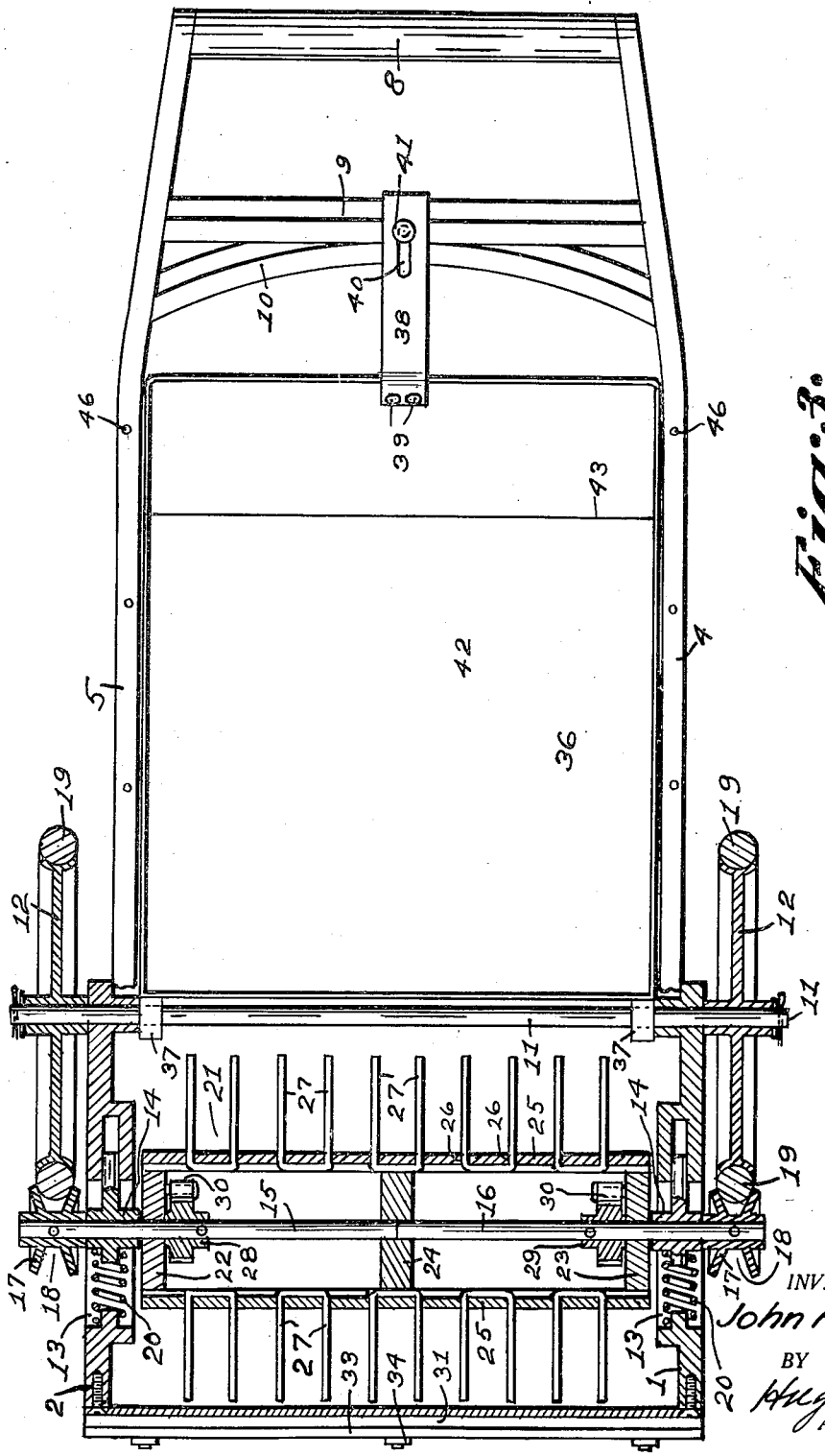

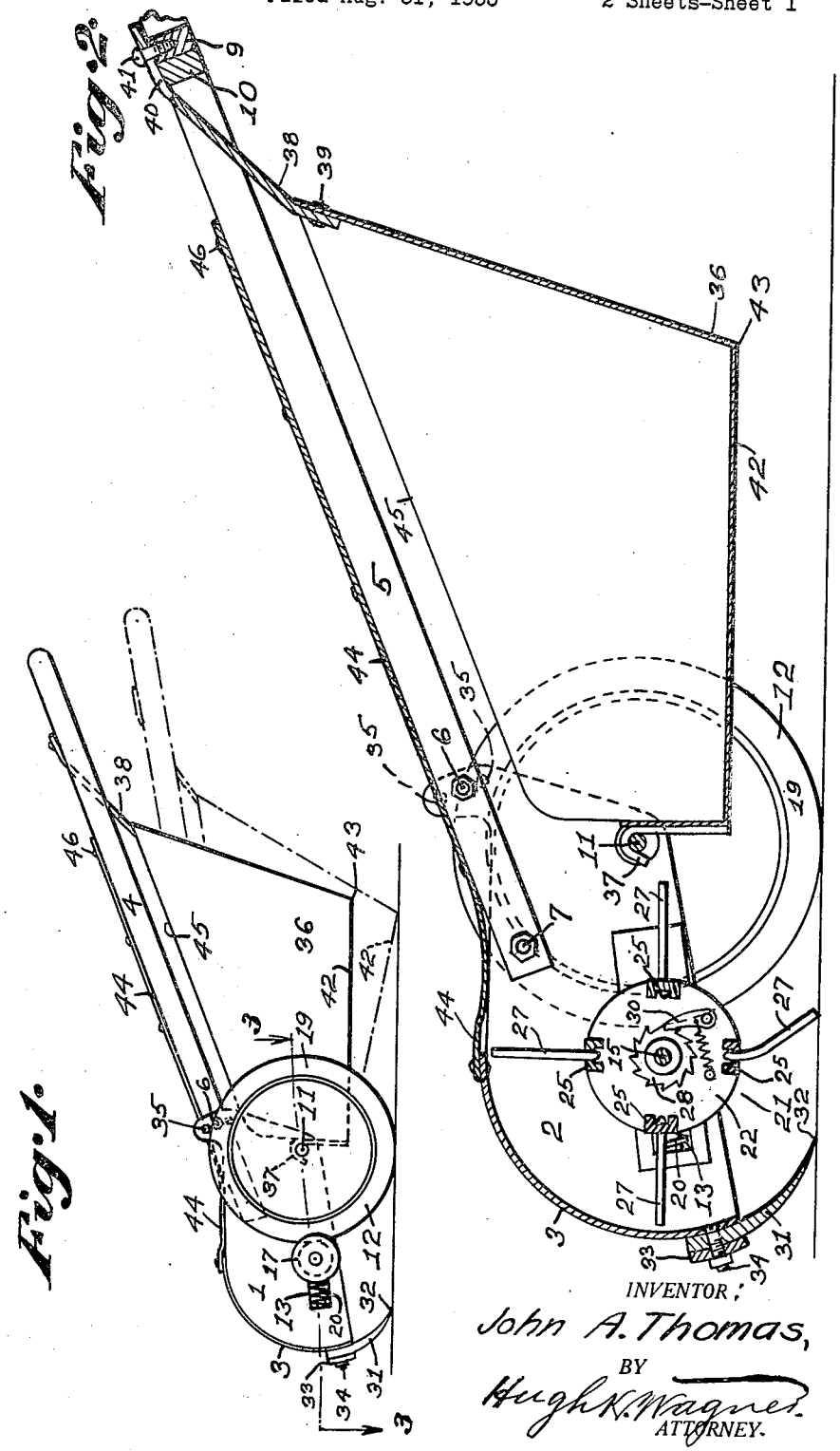

Sept. 7, 1937.   J. A. THOMAS   2,092,230
MACHINE FOR LIFTING LOOSE MATERIAL FROM LAWNS OR OTHER SURFACES
Filed Aug. 31, 1933   2 Sheets-Sheet 2

INVENTOR:
John A. Thomas,
BY
Hugh K. Wagner
ATTORNEY.

Patented Sept. 7, 1937

2,092,230

UNITED STATES PATENT OFFICE 2,092,230

MACHINE FOR LIFTING LOOSE MATERIAL FROM LAWNS OR OTHER SURFACES

John Andrew Thomas, O'Fallon, Ill., assignor of one-third to J. Edward Yoch, Belleville, Ill., and one-third to Jacob B. Yoch, St. Louis, Mo.; Edna C. Thomas executrix of said John Andrew Thomas, deceased Application August 31, 1933, Serial No. 687,566

7 Claims. (Cl. 15—79)

This invention relates to a machine for picking up leaves on lawns, rubbish, and scraps anywhere, and for miscellaneous other objects.

One of the objects of the invention is to provide a lifting machine which will with equal facility pick up divers sizes and characters of material, including small bits of paper or leaves, as well as tin cans or comparatively heavier objects.

Another object is to provide a simple means having a single driven element that will lift the articles by impact as well as by exerting a powerful suction thereon.

Another object is to provide a wall with which the driven element co-operates to direct the lifted material through a desired path, which wall is arranged to form a co-operating continuation of the surface over which the machine travels, irrespective of the irregularities and softness of such surface. Otherwise stated, it is an object of the present invention to provide a device which can operate closely and effectively over a soft and irregular surface such as that of a lawn without biting into or disintegrating such surface.

Another object is to provide a lifting machine having a minimum amount of gearing, so that the power losses caused by friction in the gearing will be negligible.

Another object is to provide a means for carrying on the frame a suitable receptacle or catcher for the lifted material, in such manner that the receptacle may be easily attached or detached without requiring the operator to stoop for this purpose.

Another object is to provide a lifter constructed of simple and few parts, which can be easily assembled or taken apart.

Other objects, advantages, and desirable features of the invention will appear in the course of the following description of an illustrative embodiment of the spirit of the invention.

In the accompanying drawings forming part of this specification, in which like numbers of reference denote like parts wherever they occur, Figure 1 is a side elevation of a lifter made in accordance with this invention;

Figure 2 is a vertical, substantially-central longitudinal sectional view of the lifter; and Figure 3 is a plan view, partly in section on the line 3—3 in Figure 1.

The frame comprises a pair of side members 1 and 2, an arcuate anterior wall 3 connecting the side members 1 and 2, a pair of handle side members 4 and 5, secured by bolts 6 and 7 to the side members 1 and 2 and connected at their posterior ends by transverse bars 8, 9, and 10. An axle 11 passes transversely through the side members 1 and 2 and has journaled on its exteriorly projecting ends the supporting wheels 12 that maintain the frame in suitable spaced relation to the surface traveled over. The side members 1 and 2 are provided with slots 13 in which are slidable the bearing boxes 14 of a divided shaft comprising left and right sections 15 and 16. The exterior ends of the shafts 15 and 16 have rigidly affixed thereto wheels 17, provided with V-grooves 18 in their peripheries to engage the preferably rubber-tired rims 19 of the wheels 12, compressed helical springs 20 in the slots 13 bearing against the boxes 14 to maintain the V-grooved wheels 17 in frictional engagement with the rims 19 of the wheels 12. A rotary frame or reel 21 is loosely mounted on the shafts 15 and 16, and comprises discs 22 and 23 journaled on the shafts 15 and 16, respectively, adjacent to their boxes 14, and a disc 24, journaled on the inner ends of both shafts 15 and 16. The discs 22, 23, and 24 are rigidly connected by lasher bars 25, preferably wood, which are provided with a series of perforations 26, for holding flexible and, preferably, elastic elongated elements, exemplified by U-shaped rubber strips 27, each strip 27 extending through a pair of perforations, so that its extreme portions project radially outward from the bars 25 and its intermediate portion extends from one to the other of the pair of perforations. The size of the perforations 26 with relation to the cross-section of the strips 27 is such that the strips are not easily dislodged from the perforations, the high co-efficient of friction of the rubber of the strips 27 on the material of the bars 25 and the stretch of the rubber contributing to the prevention of accidental or unintentional dislodgment. A ratchet wheel 28 is affixed to the shaft 15 adjacent to the disc 22, and a ratchet wheel 29 is affixed to the shaft 16 adjacent to the disc 23, each of said ratchet wheels co-operating with a pawl 30 on the disc 22 or 23 respectively adjacent thereto. By means of said ratchet wheels, the shafts 15 and 16 can drive the reel 21 in only a forward direction, that is, in a clockwise rotation, as observed in Figures 1 and 2, and, by the further provision of the divided shaft, only those wheels 12 and 17 will drive which rotate fastest, as occurs when the device is traveling in a curve or turning a corner. The lower end of the wall 3 has attached thereto a flap or lip 31 of rubber or other suitable elastic soft, pliable material, whose lower edge 32 will thereby conform easily to the irregularities of the surface over which the device travels. Since the lip 31 is directed rearwardly at its point of substantial tangency to the surface traveled over, it will be quite evident that the thin edge of the lip cannot dig into a soft and irregular surface over which the lifter will ordinarily travel, such as the soft earth of a lawn. The lip 31 is secured to the wall 3 by means of a plate 33, which is clamped against the lip 31 by means of bolts or screws 34 that pass through said wall 3. It will be observed that the lip 31 is thickest at its upper edge and tapers down to a thin lower edge, so that the bending stresses in the lip will be substantially uniform from the lower to the upper edge, and the flexing of the lip will occur gradually from top to bottom, instead of being sharply concentrated at the top, as would occur if the lip were not tapered.

The posterior end of the handle may be adjusted up or down to provide a position best adapted to the arms and body of the user or operator of the device, a series of holes 35 for the alternative reception of the bolts 6 being provided for this purpose.

A receptacle 36 is provided for receiving the lifted material, and carries hooks 37 at its anterior end that straddle the shaft or rod 11 for supporting the anterior end of the receptacle, and has a flexible strap 38 connected to its posterior end by means of suitable fastening means, exemplified by rivets 39. The posterior end of the strap 38 is provided with a slit 40 that receives a button 41 on the transverse rod 9 of the handle. When the strap 38 is taut, and the handle is elevated into working position so that the lower edge 32 of the lip 31 engages the surface traveled over, as in Figure 2, then the bottom 42 of the receptacle 36 is elevated above the surface traveled over. Otherwise stated, if the device is tilted on the axle 11, a plane that touches both the bottom of the receptacle and the bottom of the lifting device will be higher than another plane parallel to said plane and tangent to the lower side of the wheels 12, so that either the lifting device and the lip 31, or the bottom or posterior lower edge 43 of the receptacle 36, but not both at the same time, can touch the surface traveled over. The operator can easily remove the receptacle without being compelled to stoop to do it, it being merely necessary to lower the handle beyond the point where the lower posterior edge 43 of the receptacle engages the surface traveled over, when any further descent will cause the strap to become slack, when its posterior end may be unbuttoned from the rod 9, if desired. In any event, when the edge 43 touches the surface traveled over, a rearward or downward pull on the strap 38 will cause the receptacle to tilt on the edge 43 so that the hooks 37 are lifted out of engagement with the rod 11. The receptacle can be re-attached to the device by re-enacting the foregoing sequence of operations in reverse order. A cover 44, preferably of cloth, may, if desired, be attached to the frame or wall 3 so that it forms a rising continuation of the wall 3 that extends across the top 45 of the receptacle 36, so that the lifted material will be kept within proper bounds and directed wholly into the receptacle without spilling any of it. The posterior end of the cover 44 may be buttoned or otherwise suitably and detachably secured to the handle, as at 46.

The operation of the device will be readily understood. The operator applies his hands to the rod 8 of the handle, lifting it so that the lip 31 engages the floor or ground and the edge 43 of the receptacle is raised a suitable distance from the floor or ground. As the operator pushes ahead (toward the left, as shown in Figure 2), the wheels 12 rotate counter-clockwise, thereby rotating the wheels 17 and the lasher reel 21 at a much higher rate of speed than the wheels 12 and in a clockwise direction, causing the lashing strips 27 to be vigorously impacted against any loose material on the floor or ground or walk and carrying it up along the lip 31 and wall 3 and so hurling it into the receptacle 36. The rapidly moving strips 27 entrain a large volume of air and create a powerful suction, which draws in objects even if the reel 21 is lifted up out of engagement with the surface traveled over. The centrifugally extensible rubber strips 27 are flexible under their own weight and yield to accommodate themselves to articles which they engage so as to obtain a good grip on them and lift them up and project them into the receptacle. In this way, comparatively heavy articles, such as wooden blocks or tin cans, are lifted up, as well as light leaves, pieces of paper, snow, dust, and the like. The device is, also, useful for turning over straw on the ground, the lip 31 being omitted for this purpose. The lip 31 and the lasher strips 27 being of soft, yieldable material, little noise is produced by their engagement with each other or with the material that is being lifted. The friction gearing, also, contributes to quietness of operation, as well as to simplicity and economy in manufacture.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a traveling lifter, an arcuate rising wall having a tapered flexible lower end that is substantially tangent to the surface traveled over by the lifter, a lifting device substantially concentric to said wall and co-operating therewith and said surface to lift material from said surface to and up said wall.

2. In a traveling lifter, a frame, wheel means supporting the same, a rotary lifter borne by said frame, said lifter comprising a shaft in two sections, rotatable independently of each other and each shaft is connected by a ratchet to the drum of the lifter, wheel means mounted on each section and springs to maintain the lifter wheels in frictional engagement with the said supporting wheel means.

3. In a traveling lifter, a frame, wheel means supporting the same, a rotary lifter borne by said frame, said lifter comprising a shaft in two sections, rotatable independently of each other and a ratchet mounted on the outer end of each shaft to maintain said shaft in a clockwise movement, and the inner ends of the said shaft journaled in a disc, wheel means mounted on each section and springs to maintain the lifter wheels in frictional engagement with the said supporting wheel means.

4. In a traveling lifter, a frame, driving wheels, a rotary lifter mounted on a shaft in two sections rotatable independently of each other and each having wheel means engaging said driving wheels, bearing boxes mounted near the outer end of each shaft section, the said bearing boxes being in solts in the side members of the said frame, and spring means in said slots bearing against the said bearing boxes so that the wheel means mounted on the said shafts are pressed against the said driving wheels.

5. In a traveling lifter, a frame, driving wheels, a rotary lifter mounted on a shaft in two sections rotatable independently of each other and each having wheel means engaging said driving wheels, bearing boxes mounted near the outer end of each shaft section, the said bearing boxes being in slots in the side members of said frame, the said slots carrying spring means which bear longitudinally against said bearing boxes so that the wheel means mounted on said shafts are pressed against said driving wheels.

6. In a traveling lifter, a frame, driving wheels, a rotary lifter loosely mounted on a shaft in two sections rotatable independently of each other and each having wheel means outside said frame engaging said driving wheels, the said rotary lifter comprising disks spaced at each end inside said frame with a third disk spaced at the center of the said lifter and bars rigidly connecting the above mentioned disks to each other, ratchet and pawl means connecting said lifter with each of said shaft sections, and spring means to maintain the lifter wheel means in frictional engagement with the said driving wheels.

7. In a traveling lifter, a carriage having a pair of supporting wheels, a rotary lifter mounted on a shaft in two sections supported by the carriage, driving connections between the supporting wheels and the shaft sections respectively, and a ratchet connection between each shaft section and the rotary lifter whereby the lifter will be rotated in one direction only.

JOHN ANDREW THOMAS.